United States Patent [19]

Piesold

[11] Patent Number: 4,829,116
[45] Date of Patent: May 9, 1989

[54] POLYOLEFIN MOLDING COMPOSITION

[75] Inventor: Jan-Peter Piesold, Augsburg, Fed. Rep. of Germany

[73] Assignee: Hoechst Aktiengesellschaft, Frankfurt am Main, Fed. Rep. of Germany

[21] Appl. No.: 166,105

[22] Filed: Mar. 10, 1988

[30] Foreign Application Priority Data

Mar. 14, 1987 [DE] Fed. Rep. of Germany ....... 3708384

[51] Int. Cl.$^4$ .................. C08K 5/04; C08L 23/04; C08L 23/18; C08L 27/12
[52] U.S. Cl. .................... 524/278; 524/275; 525/199
[58] Field of Search ................ 525/199; 524/275, 277, 524/400, 278

[56] References Cited

U.S. PATENT DOCUMENTS 2,968,649  1/1961  Pailthorp et al. ................ 260/80.5
3,125,547  3/1964  Blatz ................................. 525/199
4,737,547  4/1988  White ................................ 525/199

FOREIGN PATENT DOCUMENTS 61-085457  5/1986  Japan ................................ 525/199

OTHER PUBLICATIONS

Smedt et al.–"The Processing Benefits of Fluoroelastomer in LLDPE"–Plastics and Rubber Processing and App. vol. 8, No. 1, (pp. 11-16), 11/86.

Primary Examiner—Carman J. Seccuro

[57] ABSTRACT

A polyolefin molding composition, in particular based on LLDPE, containing a fluorine-containing polymer together with a wax, has a broad processing range in which no surface defects occur. The throughput on extrusion is greatly increased.

4 Claims, No Drawings

POLYOLEFIN MOLDING COMPOSITION

DESCRIPTION

The present invention relates to a polyolefin molding composition having improved processing properties.

The processing of polyolefins into films, sheets or tubes usually takes place by extrusion. In this process, the plastic is melted in an extruder and forced through a nozzle into the desired shape.

For economic reasons, the highest possible throughput through the extruder is desired. One way of increasing the throughput of a pre-specified extruder is to increase the speed of the screw. However, the viscoelastic behavior of the polymer melt sets limits in this process which are well below the values which can be achieved by the machine. This is because if the extrusion rate exceeds a value which is dependent on the polymer to be processed, defects known as melt fracture occur in the surface of the extruded material.

Although those skilled in the art differentiate between various types of melt fracture, melt fracture is understood in practice to mean a matt, rough surface of the extrudate, also known as sharkskin.

Several measures have been proposed for prevention of this undesired melt fracture.

Since melt fracture is displaced towards higher shear rates with increasing temperature, it is possible to heat the polymer melt to an increased extent. However, this method can only be employed to a limited extent. Increasing processing temperatures lead to increased operation costs, to problems in dissipation of heat from the finished product, and possibly to discoloration and thermal degradation of the polymer.

Another possibility comprises modifying the extruder nozzle geometry. Nozzles having a relatively large cross-section produce a relatively high material throughput at the same shear rate. This measure is employed especially in the production of monoaxially or biaxially stretched films in which the relatively thick film obtained due to the enlargement of the nozzle slit can be adjusted to the desired thickness by means of a relatively large stretching ratio. However, this process cannot be used in all cases.

Another way of avoiding melt fracture comprises modifying the viscoelastic behavior of the polymer melt by means of additives. Such additives, which are generally highly compatible with the polyolefin, are, for example, low-molecular-weight polyethylene waxes. However, highly compatible additives may adversely affect the properties of the polymer, for example the tear resistance.

Finally, there is a possibility of modifying the interactions of the polymer melt with the nozzle walls by means of suitable additives. Such additives are generally incompatible with the polyolefin. They migrate to the boundary layer between the polymer melt and the nozzle wall where they act as a lubricant.

It is known to use specific fluorine-containing polymers as processing auxiliaries for polyolefins (cf. U.S. Pat. No. 3,125,547). These fluorine-containing polymers are generally obtained from vinylidene fluoride, vinyl fluoride, hexafluoropropene, chlorotrifluoroethylene or tetrafluoroethylene. However, the improvement in the flow behavior is not sufficient.

It has now been found that the processing range in which no surface defects occur can be greatly extended in a polyolefin molding composition which contains a fluorine-containing polymer together with a wax.

The present invention thus relates to the polyolefin molding composition described in the claims.

Suitable polyolefins are, for example:
1. high-, medium- and low-density polyethylene which may, if desired, be crosslinked, polypropylene, polyisobutylene, 1-polybutylene and 1-polymethylpentylene,
2. mixtures of the abovementioned homopolymers, for example mixtures of polypropylene and polyethylene, polypropylene and 1-polybutylene, and polypropylene and polyisobutylene,
3. copolymers of terpolymers comprising monomers of the general formula $$R-CH=CH_2$$

in which R represents hydrogen or a straight-chain or branched alkyl radical having 1 to 8 carbon atoms.

Preferred polyolefins which exhibit the surface defects described particularly frequently during processing are produced by copolymerization of ethylene with 1-olefins which contain 3-10 carbon atoms. These polyolefins have densities which are usually in the range 0.900–0.930 g/cm$^3$. For their production, low-pressure and high-pressure polymerization processes in the gas phase and in solution are used. Products of the type described are commercially available under the name LLDPE (linear low-density polyethylene).

Other preferred polyolefins which tend particularly frequently towards melt fracture during processing are polymers of ethylene in a density region greater than 0.940 g/cm$^3$, preferably 0.940–0.965 g/cm$^3$. The density of these products is adjusted during production, inter alia by copolymerization with 1-olefins. For this purpose, up to several percent of propylene, 1-butylene, 1-hexylene or 1-octylene are added during the polymerization of the ethylene. Such products are commercially available under the name HDPE (high-density polyethylene).

LLDPE is particularly preferred.

The proportion of polyolefin in the polyolefin molding composition is 95.0 to 99.998% by weight, preferably 98.0 to 99.9% by weight, in particular 99.88 to 99.97% by weight.

Suitable fluorine-containing polymers have a melting point or softening point in the range 100° to 300° C., preferably 110° to 230°. Suitable fluorine-containing polymers have a fluorine content of greater than 50% by weight, particularly suitable fluorine-containing polymers being those whose fluorine content is greater than 66 percent by weight.

Fluorine polymers which correspond particularly well to these requirements are produced by copolymerization of the vinylidene fluoride and hexafluoropropylene or by terpolymerization of vinylidene fluoride, hexafluoropropylene and tetrafluoroethylene. A terpolymer of vinylidene fluoride, hexafluoropropylene and tetrafluoroethylene having a fluorine content of 68 to 76% by weight is particularly preferred. The proportion of the fluorine-containing polymer in the polyolefin molding composition is 0.001 to 2.5% by weight, preferably 0.05 to 1% by weight, in particular 0.02 to 0.06% by weight.

Suitable waxes are:
2. Saturated or unsaturated, straight-chain or branched, monocarboxylic or polycarboxylic acids which have 12 to 40, preferably 20 to 36, carbon atoms and may optionally be substituted by OH groups or aromatic rings. Examples are stearic acid, behenic acid, cerotic acid, montanic acid and erucic acid, preferably technical grade montanic acid, as obtained by oxidative bleaching of crude montan wax.

2. Esters or partial esters of the acids from group 1 with monofunctional or polyfunctional aliphatic or aromatic alcohols, preferably esters of montanic acid with ethanediol, 1,3- or 1,4-butanediol or glycerol, and complex esters of aliphatic dicarboxylic acids, polyfunctional aliphatic alcohols and fatty acids, in particular esters of technical grade montanic acid with the diols mentioned.

3. Salts of the acids from group 1 with metals from groups IA, IIA or IIB of the Periodic Table of the Elements, for example calcium stearate, zinc stearate, sodium stearate, and sodium montanate, preferably calcium stearate, calcium montanate and sodium montanate.

4. Amides of the acids from group 1 with ammonia or mono-functional or polyfunctional aliphatic amines. Examples are oleamide, stearamide, erucamide and bis-stearoylethylenediamine, bis-stearoylethylenediamine being preferred.

5. Long-chain monohydric alcohols having 12 to 40, preferably 18 to 36 carbon atoms, for example stearyl alcohol and cerotin.

6. Alkylsulfates or alkylsulfonates containing straight-chain or branched $C_8$ to $C_{26}$-alkyl radicals and an alkali metal ion, preferably a sodium ion.

Waxes which are preferably used are technical grade montanic acid and the esters and salts thereof, and complex esters of aliphatic dicarboxylic acids, polyfunctional aliphatic alcohols and fatty acids, stearyl alcohol, calcium stearate and bis-stearoylethylenediamine. Technical grade montanic acid and the esters and salts thereof are particularly preferred.

The proportion of wax in the polyolefin molding composition is 0.001 to 2.5% by weight, preferably 0.005 to 1% by weight, in particular 0.01 to 0.06% by weight.

In addition, the polyolefin molding composition according to the invention can contain further additives, such as, for example, antioxidants, for example alkylated monophenols, alkylated hydroquinones, hydroxylated thiodiphenyl ethers, alkylidenebisphenols, benzyl compounds, acylaminophenols, esters of $\beta$-(5-tert.butyl-4-hydroxy-3-methylphenyl)propionic acid, and amides of $\beta$-(3,5-di-tert.-butyl-4-hydroxyphenyl)propionic acid, UV absorbers and light screens, for example 2-(2'-hydroxyphenyl)benzotriazoles, 2-hydroxybenzophenones, esters of optionally substituted benzoic acids, acrylates, nickel compounds, stearically hindered amines and oxalic diamides, metal deactivators, phosphates and phosphites, peroxide-destroying compounds, basic costabilizers, nucleating agents, fillers and reinforcing agents, plasticizers, optical brighteners, flameproofing agents, antistatic agents, propellants and other lubricants.

Suitable methods for metering in the fluorine-containing polymers and the wax are all methods which are also otherwise used for the addition of additives. Thus, the two components can be continuously metered into the polyolefin simultaneously or successively during production or processing.

The production of a more concentrated mixture of fluorine-containing polymer and wax in a suitable excipient material, for example a polyolefin, is particularly advantageous. These concentrates may contain 0.005 to 20% by weight, preferably 1 to 3% by weight, of fluorine-containing polymer and 0.005 to 25% by weight, preferably 0.5 to 3% by weight, of wax. In addition to the production of a concentrate which contains both fluorine-containing polymer and wax, it is also possible to use concentrates which contain the individual components in the above mentioned concentrations.

The concentrates can be produced by all methods which are known from industry, using compounders, Banbury mixers or mixer extruders. It is likewise possible to incorporate the active compounds into the melted excipient material, for example by means of stirrers. Production of the concentrate can be followed by suitable processing, for example the production of a powder or spherical or cylindrical pellets.

The concentrate is then incorporated into a polyolefin in the intended amount. In this way, particularly good distribution of the fluorine-containing polymer and the wax in the polyolefin molding composition is produced.

The fluorine-containing polyjmer an the wax each only have a weak action alone, but together they exhibit a strong synergistic effect, shown by the fact that the polyolefin molding composition according to the invention allows an output rate without surface defects which is almost twice as high, compared with molding compositions which contain neither fluorine-containing polymer nor wax or only fluorine-containing polymer or only wax.

By means of the polyolefin molding composition according to the invention, extremely high throughputs can thus be achieved during extrusion with a very high quality extrudate surface.

The following examples are intended to illustrate the invention. The amounts are given in percent by weight.

EXAMPLE 1

By means of a laboratory extruder (KK screw (short compression zone screw) diameter=20 mm, length/diameter=20; nozzle diameter=1.5 mm, length=5 mm), the screw speed was determined at which surface defects just no longer occur. The experimental material was an LLDPE film having an MFI (190/2.16) of 1. The composition temperature was 190° C.

| Mixture | max. speed min$^{-1}$ | max. output g/min |
|---|---|---|
| A | <20 | <7.5 |
| B | 25 | 11.2 |
| C | 40 | 19.0 |
| D | <20 | <8.6 |

A: LLDPE without fluorine-containing polymer[1] and without wax[2]
B: LLDPE containing 0.02% of fluorine-containing polymer[1]
C: as B, but additionally containing 0.01% of wax[2]
D: LLDPE containing 0.01% of ester wax[2]

[1] terpolymer made from vinylidene fluoride, hexafluoropropylene and tetrafluoroethylene, drip point 126° C.
[2] ester wax made from montanic acid and ethylene glycol.

EXAMPLE 2

The effect of the additives on the torque, the screw back-pressure and the pressure in the extruder was tested.

Measurement extruder, KK screw diameter=30 mm, length/diameter=15; 30 min$^{-1}$, nozzle 150/4;

| Mixture | M | G | P | R | Extruder surface |
|---------|-----|------|-----|------|------------------|
| A | 135 | 40 | 130 | 11 | matt |
| B | 120 | 38.6 | 130 | 11.5 | smooth |
| C | 110 | 38.6 | 120 | 10 | smooth |
| D | 128 | 39.4 | 130 | 10.5 | matt |

Mixtures as specified in Example 1.
M = torque in Nm,
G = output in g/min;
P = pre-nozzle pressure in bar;
R = screw back-pressure in KN

| Mixture | Material pressure | Film | Notes |
|---------|-------------------|---------|-------|
| A | 135 | 80 μm | matt |
| B | 125 | 80 μm | clear |
| C | 115 | 80 μm | clear |
| D | 130 | 80 μm | matt |

I claim:

1. A polyolefin molding composition, comprising 99.998 to 95.0% by weight of at least one homopolymer of ethylene, propylene, butylene, methyl-1-butylene or methyl-1-pentylene or at least one copolymer or terpolymer of 1-olefins of the formula $$R-CH=CH_2$$

in which R represents H or a straight-chain or branched alkyl radical having 1 to 8 carbon atoms, or a mixture of a said homopolymer, a said copolymer or a said terpolymer, 0.001 to 2.5% by weight of a fluorine-containing polymer of vinylidene fluoride, vinyl fluoride, tetrafluoroethylene, hexafluoropropylene or chlorotrifluoroethylene having a fluorine content of more than 50% by weight and a melting point or softening point of 100° to 300° C., and 0.001 to 2.5% by weight of a wax being a member of the group consisting of montanic acid, a salt of montanic acid, an ester of montanic acid with ethanediol, 1,3-butanediol, 1,4-butanediol or glycerol, and a complex ester made from the components comprising an aliphatic dicarboxylic acid, a polyfunctional aliphatic alcohol and a fatty acid.

2. a polyolefin molding composition as claimed in claim 1, wherein the fluorine-containing polymer is a terpolymer of vinylidene fluoride, hexafluoropropylene and tetrafluoroethylene with a fluorine content of 68 to 76% by weight.

3. A polyolefin molding composition as claimed in claim 1, wherein the wax is technical grade montanic acid, a salt of technical grade montanic acid or an ester of technical grade montanic acid with ethanediol, 1,3-butanediol, 1,4-butanediol or glycerol.

4. A polyolefin molding composition, comprising 99.998 to 95.0% by weight of at least one homopolymer of ethylene, propylene, butylene, methyl-1-butylene or methyl-1-pentylene or at least one copolymer or terpolymer of 1-olefins of the formula $$R-CH=CH_2$$

in which R represents H or a straight-chain or branched alkyl radical having 1 to 8 carbon atoms, or a mixture of a said homopolymer, a said copolymer or a said terpolymer, 0.001 to 2.5% by weight of a fluorine-containing polymer of vinylidene fluoride, vinyl fluoride, tetrafluoroethylene, hexafluoropropylene or chlorotrifluoroethylene having a fluorine content of more than 50% by weight and a melting point or softening point of 100° to 300° C., and 0.001 to 2.5% by weight of a wax, said wax being montanic acid, a salt of montanic acid, or an ester of montanic acid with ethanediol, 1,3-butanediol, 1,4-butanediol or glycerol.

* * * * *